US010565506B2

(12) United States Patent
Bigby et al.

(10) Patent No.: US 10,565,506 B2
(45) Date of Patent: Feb. 18, 2020

(54) COMMUNICATION GENERATION IN COMPLEX COMPUTING NETWORKS

(71) Applicant: RESEARCH NOW GROUP, INC., Plano, TX (US)

(72) Inventors: Michael D. Bigby, Dallas, TX (US); Leonard A. Bucchino, III, Frisco, TX (US); Charles A. Hunt, Frisco, TX (US); Khusro Khalid, Frisco, TX (US); Rabik Maharjan, Dallas, TX (US); Gregory B. Molik, Plano, TX (US); Michael C. Munsie, Plano, TX (US); Timothy W. Proffitt, Carrollton, TX (US); Bradley D. White, Plano, TX (US)

(73) Assignee: Research Now Group, LLC, Plano, TX (US)

( * ) Notice: Subject to any disclaimer, the term of this patent is extended or adjusted under 35 U.S.C. 154(b) by 0 days.

(21) Appl. No.: 16/235,689

(22) Filed: Dec. 28, 2018

(65) Prior Publication Data

US 2019/0138915 A1 May 9, 2019

Related U.S. Application Data

(63) Continuation of application No. 15/097,851, filed on Apr. 13, 2016, now Pat. No. 10,169,704.

(60) Provisional application No. 62/146,483, filed on Apr. 13, 2015.

(51) Int. Cl.
*G06N 5/02* (2006.01)
*H04L 12/721* (2013.01)
*H04L 29/06* (2006.01)
*H04L 29/08* (2006.01)

(52) U.S. Cl.
CPC ............... *G06N 5/02* (2013.01); *H04L 45/14* (2013.01); *H04L 63/08* (2013.01); *H04L 67/18* (2013.01)

(58) Field of Classification Search
CPC ......... H04L 45/14; H04L 63/08; H04L 67/18; G06N 5/02
USPC ......................................................... 370/254
See application file for complete search history.

(56) References Cited

U.S. PATENT DOCUMENTS

| 6,202,198 | B1 * | 3/2001 | Bibyk | ...... G06F 3/05 341/143 |
| 7,155,421 | B1 * | 12/2006 | Haldar | ...... G06N 5/003 706/46 |
| 8,103,049 | B2 * | 1/2012 | Petrovic | ...... H04L 9/002 382/100 |
| 8,855,271 | B2 * | 10/2014 | Brock | ...... H04L 51/24 379/201.01 |

(Continued)

FOREIGN PATENT DOCUMENTS

CN 103957522 A * 7/2014 ............ H04L 63/08

OTHER PUBLICATIONS

International Search Report and Written Opinion of the International Searching Authority dated May 24, 2016, in connection with International Application No. PCT/US2016/027296, 14 pages.

*Primary Examiner* — Afsar M Qureshi
(74) *Attorney, Agent, or Firm* — Baker & McKenzie LLP

(57) ABSTRACT

This disclosure is directed to communication generation by traversing routes of a graph in a complex computing network. The communication generation is used for determining whether an input signal has certain desired signal attributes.

20 Claims, 6 Drawing Sheets

(56) References Cited

U.S. PATENT DOCUMENTS

| | | | | |
|---|---|---|---|---|
| 8,898,786 | B1* | 11/2014 | Stibel | H04L 63/00 |
| | | | | 726/23 |
| 9,182,778 | B2* | 11/2015 | Sharma | G06T 1/0064 |
| 2009/0306967 | A1* | 12/2009 | Nicolov | G06F 17/2785 |
| | | | | 704/9 |
| 2011/0106731 | A1* | 5/2011 | Pearson | G06N 5/04 |
| | | | | 706/11 |
| 2014/0171039 | A1* | 6/2014 | Bjontegard | H04W 4/029 |
| | | | | 455/414.1 |
| 2015/0133025 | A1* | 5/2015 | Ponomarev | A63H 3/28 |
| | | | | 446/484 |
| 2015/0349918 | A1* | 12/2015 | Mijarez Castro | H04B 3/48 |
| | | | | 375/227 |
| 2016/0283197 | A1* | 9/2016 | Wilber | G06F 7/58 |
| 2016/0321536 | A1* | 11/2016 | Ponomarev | H04W 4/70 |

* cited by examiner

418 — DETERMINING, FOR THE FIRST INPUT SIGNAL, A SECOND SIGNAL ATTRIBUTE NOT SENSED BY THE SIGNAL SENSOR, THE SECOND SIGNAL ATTRIBUTE BEING EQUIVALENT TO THE SECOND DESIRED SIGNAL ATTRIBUTE

420 — GENERATING A FIRST COMMUNICATION FOR TRANSMISSION TO THE FIRST COMPUTING DEVICE

422 — TRANSMITTING THE FIRST COMMUNICATION TO THE FIRST COMPUTING DEVICE

424 — RECEIVING A FIRST RESPONSE TO THE FIRST COMMUNICATION FROM THE FIRST COMPUTING DEVICE

426 — DETERMINING, BASED ON THE FIRST RESPONSE TO THE FIRST COMMUNICATION, AN INTERMEDIARY SIGNAL ATTRIBUTE FOR THE FIRST SIGNAL

428 — GENERATING, BASED ON A ROUTE CONNECTING, EITHER DIRECTLY OR INDIRECTLY, THE INTERMEDIARY SIGNAL ATTRIBUTE WITH THE SECOND SIGNAL ATTRIBUTE ON THE GRAPH, A SECOND COMMUNICATION FOR TRANSMISSION TO THE FIRST COMPUTING DEVICE

430 — TRANSMITTING THE SECOND COMMUNICATION TO THE FIRST COMPUTING DEVICE

432 — RECEIVING A SECOND RESPONSE TO THE SECOND COMMUNICATION FROM THE FIRST COMPUTING DEVICE

434 — DETERMINING, BASED ON THE SECOND RESPONSE TO THE SECOND COMMUNICATION, THAT THE SECOND SIGNAL ATTRIBUTE IS ASSOCIATED WITH THE FIRST INPUT SIGNAL

FIG. 4B

COMMUNICATION GENERATION IN COMPLEX COMPUTING NETWORKS

CROSS-REFERENCE TO RELATED APPLICATIONS

This application is a continuation of and claims priority to U.S. application Ser. No. 15/097,851, filed Apr. 13, 2016, which claims priority to and is a non-provisional of U.S. Provisional Application 62/146,483, filed Apr. 13, 2015, all of which are incorporated by reference in their entirety for all purposes.

BACKGROUND

There is a need for digital signal processors to perform AI communication generation in a complex computing network in order to determine whether an input signal has desired signal attributes.

BRIEF SUMMARY

In some embodiments, an apparatus is provided for AI communication generation by traversing routes of a graph in a complex computing network. The intelligent communication generation may be used for determining whether an input signal has desired signal attributes. The intelligent communication generation and the traversing of the graph may be rooted in computing technology. The apparatus comprises: a signal communication interface for: establishing a first connection to a first input signal system; receiving, from the first input signal system, a first desired signal attribute and a second desired signal attribute; establishing a second connection to a second input signal system; receiving, from the second input signal system, a first input signal; establishing a third connection to a third input signal system; accessing a graph stored at the third input signal system, the graph comprising a plurality of signal attributes and routes between at least some of the signal attributes in the plurality of signal attributes; transmitting communications to a first computing device associated with the first input signal; and receiving responses to the communications from the first computing device associated with the first input signal; a signal sensor for: sensing a first signal attribute associated with the first input signal; a memory for storing instructions for execution by the signal processor; and a signal processor for: determining the first signal attribute is equivalent to the first desired signal attribute; determining, for the first input signal, a second signal attribute not sensed by the signal sensor, the second signal attribute being equivalent to the second desired signal attribute; generating a first communication for transmission to the first computing device; determining, based on a first response to the first communication, an intermediary signal attribute for the first signal; generating, based on a route connecting, either directly or indirectly, the intermediary signal attribute with the second signal attribute on the graph, a second communication for transmission to the first computing device; and determining, based on a second response to the second communication, that the second signal attribute is associated with the first input signal. In some embodiments, any apparatus described herein may be a communication server.

In some embodiments, the digital signal processor comprises a logic unit for executing computing operations on signals or signal attributes, and a control unit for informing the logic unit which computing operations are to be executed on the signals or signal attributes, wherein the logic unit, in coordination with the control unit, is further for executing or performing the various operations of the digital signal processor.

In some embodiments, the digital signal processor is further for modifying the route such that the intermediary signal attribute is connected to a second intermediary signal attribute, wherein modifying the route causes dynamic modification of the second communication for transmission to the first computing device.

In some embodiments, the route is modified after transmission of the first communication to the first computing device.

In some embodiments, the route is modified either before or during transmission of the first communication to the first computing device.

In some embodiments, the second communication is transmitted to the first computing device in real-time after the first communication is transmitted to the first computing device or after the first response to the first communication is received from the first computing device.

In some embodiments, the second communication is presented on the first computing device in real-time after the first communication is presented on the first computing device.

In some embodiments, the first communication is based on at least one of the first signal attribute or the second signal attribute.

In some embodiments, a route on the graph connects, either directly or indirectly, the at least one of the first signal attribute or the second signal attribute to the intermediary signal attribute.

In some embodiments, the first signal attribute was determined to be associated with the first input signal based on a response to a previous communication transmitted to a computing device associated with the first input signal.

In some embodiments, the digital signal processor is further for: determining the intermediary signal attribute is asynchronous with the first signal attribute; in response to determining the intermediary signal attribute is asynchronous with the first signal attribute, nullify the first signal attribute associated with the first input signal.

In some embodiments, nullifying the first signal attribute associated with the first input signal causes at least some signal attributes associated with the first input signal to be nullified.

In some embodiments, the route connecting the intermediary signal attribute and the second signal attribute is stored as information in the intermediary signal attribute or the second signal attribute.

In some embodiments, the first communication comprises a first question of a survey communication, and wherein the second communication comprises a second question of the survey communication. In some embodiments, the first communication or the second communication comprises multiple communications or transmissions or a single communication or transmission.

In some embodiments, the first input signal is associated with a first user.

In some embodiments, the first input signal is sensed based on accessing the graph.

In some embodiments, the first input signal is associated with a digital computing history.

In some embodiments, the digital signal processor is further for modifying the graph such that at least one of a signal attribute or a route associated with a signal attribute (or a characteristic associated with the graph) is modified on the graph, wherein the modification of the graph causes real-time modification of a communication based on the graph. In some embodiments, modification may refer to modification, addition, deletion, etc.

In some embodiments, the digital signal processor is further adding a translation option or translation metadata to the graph or to a signal attribute on the graph, wherein the addition of the translation option or translation metadata causes a translated communication to be generated based on the graph.

In some embodiments, the first communication and the second communication are transmitted in a single transmission, and wherein the first response and the second response are received in a single reception.

In some embodiments, the first communication and the second communication are transmitted as separate transmissions, and the first response and the second response are received as separate receptions.

In some embodiments, the first signal attribute is a signal attribute derived from a known signal attribute associated with the graph.

In some embodiments, the second signal attribute is a volatile signal attribute associated with a period of validity.

In some embodiments, a method is provided for AI communication generation by traversing routes of a graph in a complex computing network, the intelligent communication generation being used for determining whether an input signal has desired signal attributes, the intelligent communication generation and the traversing of the graph being rooted in computing technology. The method comprises: establishing a first connection to a first input signal system; receiving, from the first input signal system, a first desired signal attribute and a second desired signal attribute; establishing a second connection to a second input signal system; receiving, from the second input signal system, a first input signal; establishing a third connection to a third input signal system; accessing a graph stored at the third input signal system, the graph comprising a plurality of signal attributes and routes between at least some of the signal attributes in the plurality of signal attributes; sensing a first signal attribute associated with the first input signal; determining the first signal attribute is equivalent to the first desired signal attribute; determining, for the first input signal, a second signal attribute not sensed by the signal sensor, the second signal attribute being equivalent to the second desired signal attribute; generating a first communication for transmission to the first computing device; transmitting the first communication to the first computing device; receiving a first response to the first communication from the first computing device; determining, based on the first response to the first communication, an intermediary signal attribute for the first signal; generating, based on a route connecting, either directly or indirectly, the intermediary signal attribute with the second signal attribute on the graph, a second communication for transmission to the first computing device; transmitting the second communication to the first computing device; receiving a second response to the second communication from the first computing device; and determining, based on the second response to the second communication, that the second signal attribute is associated with the first input signal.

In some embodiments, another apparatus may be provided for AI communication generation by traversing routes of a graph in a complex computing network, the intelligent communication generation being used for determining whether an input signal has desired signal attributes, the intelligent communication generation and the traversing of the graph being rooted in computing technology. The apparatus comprises: a signal communication interfacing means for: establishing a first connection to a first input signal system; receiving, from the first input signal system, a first desired signal attribute and a second desired signal attribute; establishing a second connection to a second input signal system; receiving, from the second input signal system, a first input signal; establishing a third connection to a third input signal system; accessing a graph stored at the third input signal system, the graph comprising a plurality of signal attributes and routes between at least some of the signal attributes in the plurality of signal attributes; transmitting communications to a first computing device associated with the first input signal; and receiving responses to the communications from the first computing device associated with the first input signal; a signal sensing means for: sensing a first signal attribute associated with the first input signal; and a digital signal processing means for: determining the first signal attribute is equivalent to the first desired signal attribute; determining, for the first input signal, a second signal attribute not sensed by the signal sensor, the second signal attribute being equivalent to the second desired signal attribute; generating a first communication for transmission to the first computing device; determining, based on a first response to the first communication, an intermediary signal attribute for the first signal; generating, based on a route connecting, either directly or indirectly, the intermediary signal attribute with the second signal attribute on the graph, a second communication for transmission to the first computing device; and determining, based on a second response to the second communication, that the second signal attribute is associated with the first input signal.

In some embodiments, a method is provided for communication generation, based on traversing routes of a graph, in a complex computing network. The method comprises: establishing a first connection to a first input data system; receiving, from the first input data system, a first desired data attribute and a second desired data attribute; establishing a second connection to a second input data system; receiving, from the second input data system, first input data; establishing a third connection to a third input data system or the second input data system; accessing a graph stored at the third input data system or the second input data system, the graph comprising a plurality of data attributes and routes among at least some of the data attributes in the plurality of data attributes; sensing, using one or more computing device processors, a first data attribute associated with the first input data; determining, using the one or more computing device processors, the first data attribute is equivalent to the first desired data attribute; sensing, using the one or more computing device processors, a second data attribute associated with the first input data; determining, using the one or more computing device processors, the second data attribute is equivalent to the second desired data attribute; determining, using the one or more computing device processors, an intermediary data attribute on the graph, wherein a first route connects, either directly or indirectly, the intermediary data attribute to the first data attribute on the graph, and wherein a second route connects, either directly or indirectly, the intermediary data attribute to the second data attribute on the graph; determining, using the one or more computing device processors, a period of validity associated with the intermediary data attribute has expired; in response to determining the period of validity associated with the intermediary data attribute has expired, generating, using the one or more computing device processors, and based on the intermediary data attribute, a first communication for transmission to a first computing device; transmitting, using the one or more computing device processors, the first communication to the first computing device; receiving, using the one or more computing device processors, a first response, to the first communication, from the first computing device; determining, based on the first response to the first communication, using the one or more computing device processors, a new intermediary data attribute associated with the first input data; determining, using the one or more computing device processors, whether the new intermediary data attribute associated with the first input data is consistent or inconsistent with the intermediary data attribute associated with the first input data; and determining, based on the new intermediary data attribute associated with the first input data being consistent or inconsistent with the intermediary data attribute associated with the first input data, whether to nullify or invalidate the first data attribute or the second data attribute associated with the first input data.

In some embodiments, the second data attribute is a parent of the intermediary data attribute.

In some embodiments, the intermediary data attribute is a parent of the first data attribute.

In some embodiments, determining, based on the new intermediary data attribute associated with the first input data being consistent or inconsistent with the intermediary data attribute associated with the first input data, whether to nullify or invalidate the first data attribute or the second data attribute associated with the first input data comprises determining, based on the new intermediary data attribute associated with the first input data being consistent or inconsistent with the intermediary data attribute associated with the first input data, whether to nullify or invalidate the first data attribute associated with the first input data.

In some embodiments, nullifying or invalidating the first data attribute or the second data attribute associated with the first input data causes at least some data attributes associated with the first input data to be nullified or invalidated.

In some embodiments, the method further comprises transmitting at least one communication to the first computing device, the at least one communication associated with the at least some nullified or invalidated data attributes.

In some embodiments, the first data attribute or the second data attribute is sensed based on accessing the graph.

In some embodiments, the first computing device comprises one or more computing devices associated with a user associated with the first response.

In some embodiments, a method is provided for communication generation, based on traversing routes of a graph, in a complex computing network, the method comprising: establishing a first connection to a first input data system; receiving, from the first input data system, a first desired data attribute; establishing a second connection to a second input data system; receiving, from the second input data system, a first input data; establishing a third connection to a third input data system or the second input data system; accessing a graph stored at the third input data system or the second input data system, the graph comprising a plurality of data attributes and routes among at least some of the data attributes in the plurality of data attributes; sensing, using one or more computing device processors, a first data attribute associated with the first input data; determining, using the one or more computing device processors, the first data attribute is equivalent to the first desired data attribute; determining, using the one or more computing device processors, an intermediary data attribute on the graph, wherein a route connects, either directly or indirectly, the intermediary data attribute to the first data attribute on the graph; determining, using the one or more computing device processors, a period of validity associated with the intermediary data attribute has expired; in response to determining the period of validity associated with the intermediary data attribute has expired, generating, using the one or more computing device processors, based on the intermediary data attribute, a first communication for transmission to a first computing device; transmitting, using the one or more computing device processors, the first communication to the first computing device; receiving, using the one or more computing device processors, a first response, to the first communication, from the first computing device; determining, based on the first response to the first communication, using the one or more computing device processors, a new version of the intermediary data attribute associated with the first input data; and determining, based on the new version of the intermediary data attribute associated with the first input data, using the one or more computing device processors, whether to nullify or invalidate the first data attribute associated with the first input data.

In some embodiments, the method further comprises nullifying or invalidating, using the one or more computing device processors, and based on the new version of the intermediary data attribute being inconsistent with a previous version of the intermediary data attribute, the first data attribute associated with the first input data.

In some embodiments, the intermediary data attribute is a parent of the first data attribute.

In some embodiments, the intermediary data attribute is a child of the first data attribute.

In some embodiments, the method further comprises retaining, using the one or more computing device processors, and based on the new version of the intermediary data attribute, the first data attribute associated with the first input data, wherein the new version of the intermediary data attribute is substantially equivalent to a previous version of the intermediary data attribute.

In some embodiments, the method further comprises transmitting, using the one or more computing device processors, a second communication to the first computing device, wherein a response, from the first computing device, to the second communication determines a validity of the first data attribute associated with the first input data.

In some embodiments, a period of validity associated with the first data attribute has not expired.

In some embodiments, the first communication is generated further based on the first data attribute.

In some embodiments, the first data attribute is sensed based on accessing the graph.

In some embodiments, the first computing device comprises one or more computing devices associated with a user associated with the first response.

In some embodiments, the method further comprises: sensing, using the one or more computing device processors, a second data attribute associated with the first input data; and determining, using the one or more computing device processors, the second data attribute is equivalent to a second desired data attribute, wherein the second data attribute cannot be nullified or invalidated.

In some embodiments, an apparatus is provided communication generation, based on traversing routes of a graph, in a complex computing network. The apparatus comprises one or more computing device processors configured for: establishing a first connection to a first input data system; receiving, from the first input data system, a first desired data attribute; establishing a second connection to a second input data system; receiving, from the second input data system, a first input data; establishing a third connection to a third input data system or the second input data system; accessing a graph stored at the third input data system or the second input data system, the graph comprising a plurality of data attributes and routes among at least some of the data attributes in the plurality of data attributes; sensing a first data attribute associated with the first input data; determining, using the one or more computing device processors, the first data attribute is equivalent to the first desired data attribute; determining an intermediary data attribute on the graph, wherein a route connects, either directly or indirectly, the intermediary data attribute to the first data attribute on the graph; determining a period of validity associated with the intermediary data attribute has expired; in response to determining the period of validity associated with the intermediary data attribute has expired, generating based on the intermediary data attribute, a first communication for transmission to a first computing device; transmitting the first communication to the first computing device; receiving a first response, to the first communication, from the first computing device; determining, based on the first response to the first communication, a new version of the intermediary data attribute associated with the first input data; determining whether the new version of the intermediary data attribute associated with the first input data: is consistent or inconsistent with a previous version of the intermediary data attribute associated with the first input data, or is consistent or inconsistent with the first data attribute associated with the first input data; and determining, based on the new version of the intermediary data attribute associated with the first input data: being consistent or inconsistent with a previous version of the intermediary data attribute associated with the first input data, or being consistent or inconsistent with the first data attribute associated with the first input data, whether to nullify or invalidate the first data attribute associated with the first input data, wherein the one or more computing device processors are comprised in at least one of the first input data system, the second input data system, the third input data system, the first computing devices, or a server.

BRIEF DESCRIPTION OF THE DRAWINGS

FIGS. 4A and 4B are block diagrams of a method for AI communication generation in a complex computing network, in accordance with some embodiments of the invention.

Figure 1:
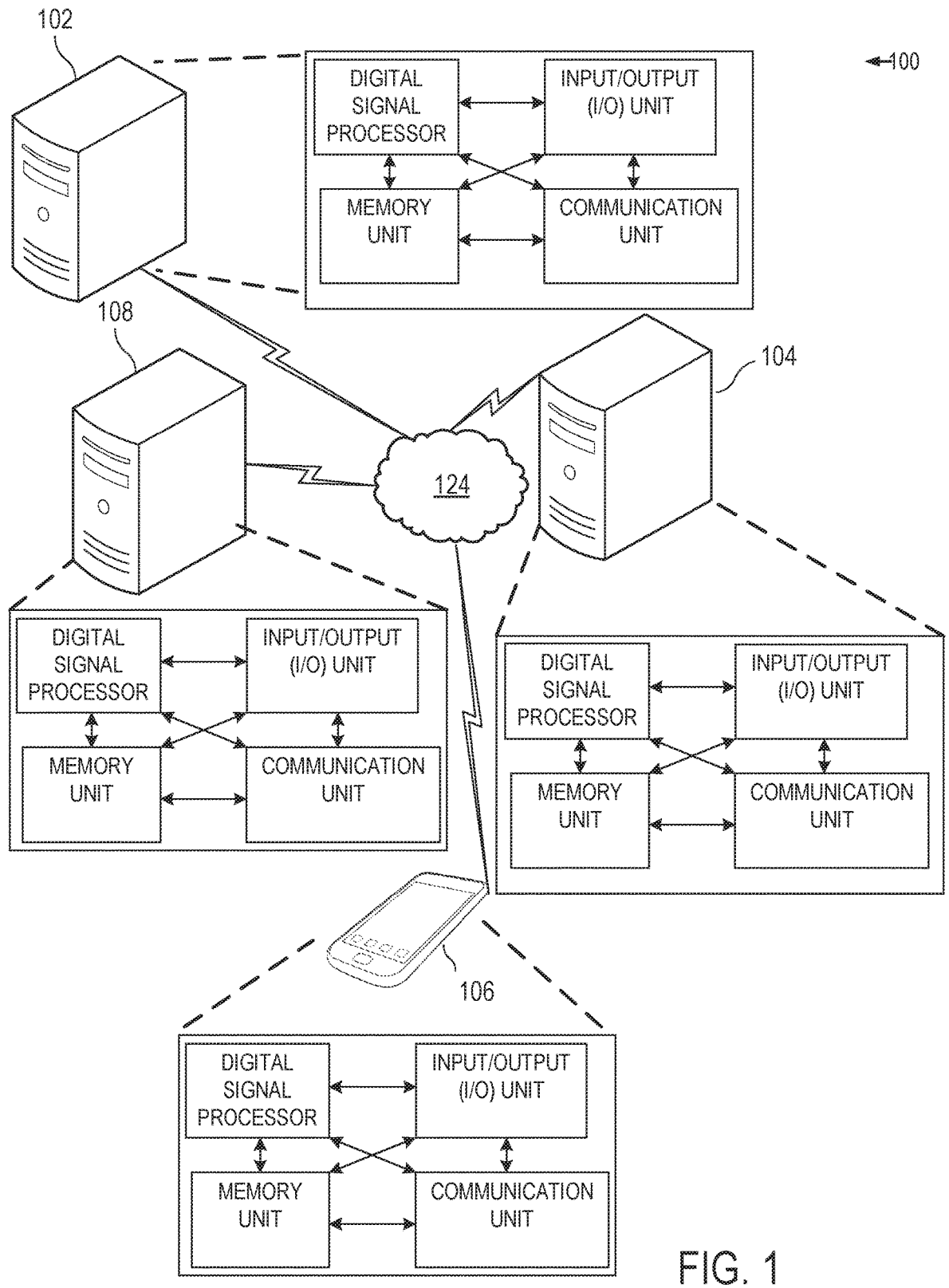
FIG. 1 is a block diagram of a complex computing network for AI communication generation, in accordance with some embodiments of the invention.

All of these drawings are illustrations of certain embodiments. The scope of the claims is not limited to the specific embodiments illustrated in the drawings and described below.

DETAILED DESCRIPTION OF THE EMBODIMENTS

In order to determine whether an input signal has a desired signal attribute, a first communication may be prepared and transmitted to a computing device associated with a first signal. Based on the response to the first communication received from the computing device, a second communication may be dynamically prepared in real-time and transmitted to the computing device. The response to the second communication may be used to determine whether the input signal has the desired signal attribute. In some embodiments, a signal attribute may also be referred to as a signal parameter.

FIG. 1 is a block diagram of a complex computing network 100 for AI communication generation. The network comprises a first input signal system 102, a second input signal system 104, a computing device 106 (e.g., a non-mobile computing device such as a desktop computer or a mobile computing device such as a mobile phone, laptop, tablet, watch, etc.), and an AI digital signal processing system 108. Each of the first input signal system, the second input signal system, the computing device, and the AI digital signal processing system may comprise a digital signal processor, a memory unit, an input/output (I/O) unit, and a communication unit. The digital signal processor, the memory unit, the I/O unit, and the communication unit are described in further detail in FIG. 2. The functionality of multiple input signal systems may be combined into a single input signal system. The functionality of the computing device and the AI digital signal processing system may be combined into a single system. In some embodiments, the term "signal" may refer to "data" or "information." Any reference to signals may also include references to the contents of the signals, e.g., signal attributes. Any signals described herein may be electronic or electromagnetic signals. Additionally, any signals may be either be transitory or non-transitory signals. The terms system, apparatus, device, unit, sub-unit, element etc., may be used interchangeably in some embodiments. In some embodiments, a method is provided for performing the various steps performed by any system described herein. In some embodiments, a non-transitory computer-readable medium comprising code is provided for causing a system to perform the various methods described herein. In some embodiments, an apparatus may comprise a housing that comprises various units, sub-units, elements, etc., such as those illustrated in FIG. 2. In some embodiments, a chipset may be disposed in the housing and may be interfaced with a processor such as a digital signal processor. The chipset may have hardware for supporting a first connection to the first input signal system, a second connection to the second input signal system, a third connection to the computing device, a fourth connection to the AI digital signal processing system, or any other connection described herein.

Figure 2:
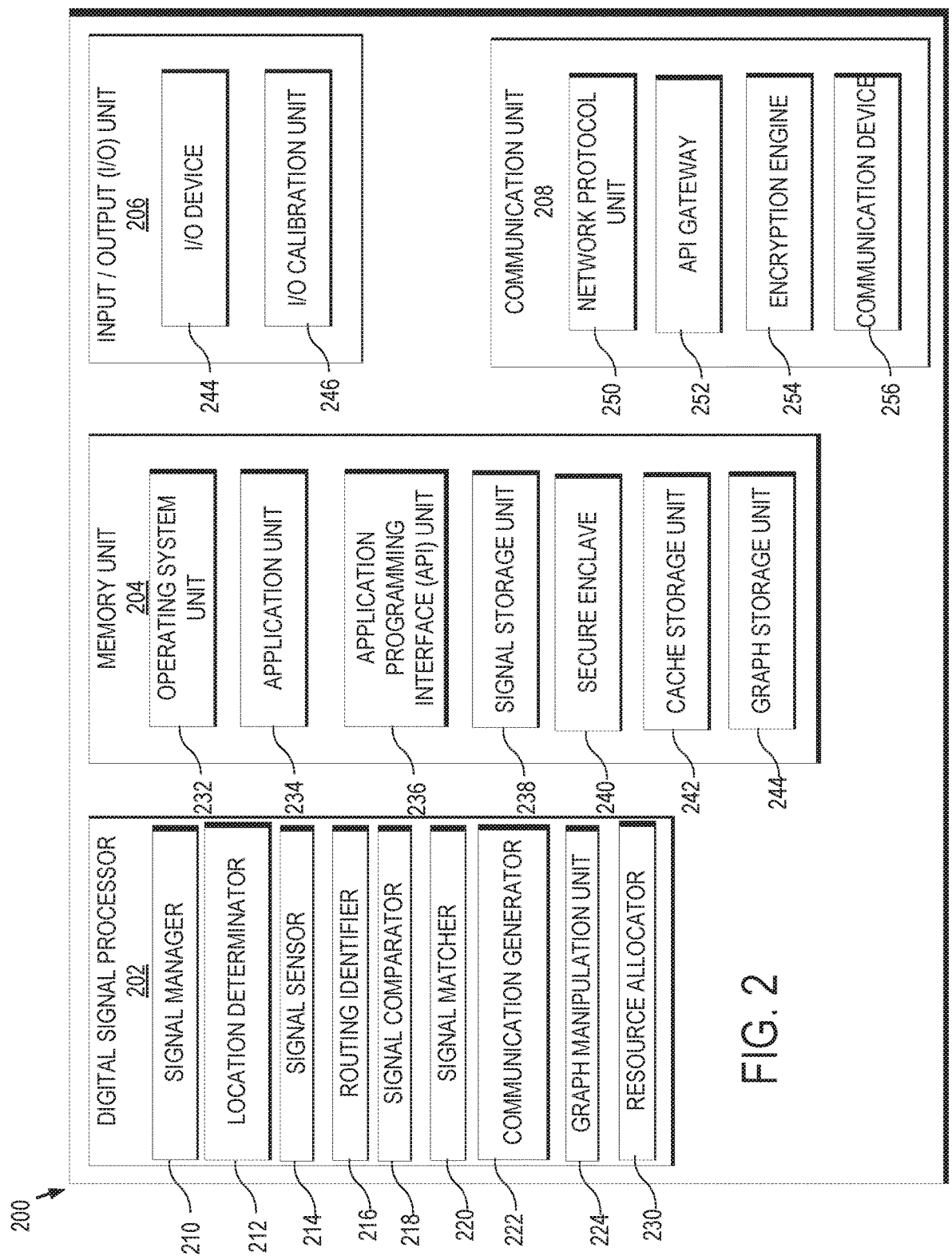
FIG. 2 is a block diagram of a complex computing environment for AI communication generation, in accordance with some embodiments of the invention.

FIG. 2 illustrates an exemplary complex computing environment 200 for AI communication generation. For example, the computing environment may be included in and/or utilized by the first input signal system, the second input signal system, the computing device, the AI digital signal processing system, and/or any other system described herein. The computing environment and/or any of its units and/or subunits described herein may include general hardware, specifically-purposed hardware, and/or specially purposed-software.

The computing environment may include, among other elements, a digital signal processor 202, a memory unit 204, an input/output (I/O) unit 206, and/or a communication unit 208. As described herein, each of the digital signal processor, the memory unit, the I/O unit, and/or the communication unit may include and/or refer to a plurality of respective units, subunits, and/or elements. The various units, subunits, and/or elements may be implemented entirely in hardware, entirely in software, or in a combination of hardware and software. Some of the units, subunits, and/or elements may be optional. Any software described herein may be specially purposed software for performing a particular function. In some embodiments, hardware may also be specially purposed hardware for performing some particular functions. Furthermore, each of the digital signal processor, the memory unit, the I/O unit, and/or the communication unit may be operatively and/or otherwise communicatively coupled with each other.

The digital signal processor may control any of the other units, elements of the units, and/or functions performed by the units. Any actions described herein as being performed by a processor may be taken by the digital signal processor alone and/or by the digital signal processor in conjunction with one or more additional processors, units, subunits, elements, components, devices, and/or the like. Additionally, while only one digital signal processor may be shown in FIG. 2, multiple digital signal processors may be present and/or otherwise included in the computing environment. Thus, while instructions may be described as being executed by the digital signal processor (and/or various subunits of the digital signal processor), the instructions may be executed simultaneously, serially, and/or by one or multiple digital signal processors in parallel. In some embodiments, the digital signal processor may refer to any microprocessor, such as a specially purposed microprocessor. In some embodiments, the digital signal processor may refer to any type of signal processor, including an analog signal processor.

In some embodiments, the digital signal processor may be implemented as one or more computer signal processor (CPU) chips and/or graphical signal processor (GPU) chips and may include a hardware device capable of executing computer instructions. The digital signal processor may execute instructions, codes, computer programs, and/or scripts. The instructions, codes, computer programs, and/or scripts may be received from and/or stored in the memory unit, the I/O unit, the communication unit, subunits and/or elements of the aforementioned units, other devices and/or computing environments, and/or the like. As described herein, any unit and/or subunit (e.g., element) of the computing environment and/or any other computing environment may be utilized to perform any operation. Particularly, the computing environment may not include a generic computing system, but instead may include a customized computing system designed to perform the various methods described herein.

In some embodiments, the digital signal processor may include, among other elements, subunits such as a signal manager 210 (for managing, receiving, processing, analyzing, organizing, and transforming any signals), a location determinator 212 (described below), a signal sensor 214 (for sensing signals and signal attributes), a routing identifier 216 (for identifying routing signals for transmitting communications to computing devices associated with input signals), a signal comparator 218 (for comparing signals and/or signal attributes to other signals and/or signal attributes which may be obtained from a graph to determine whether signals and/or signal attributes are synchronous or asynchronous), a signal matcher 220 (for determining whether a signal attribute matches a signal attribute of the same or different signal, or determining whether a signal matches another signal), a communication generator 222 (for generating information for communication to a computing device), a graph manipulator unit 224 (for accessing information from a graph, traversing routes of the graph, and/or implementing changes or modifications to the graph, etc.), and a resource allocator 230 (described below). Each of the aforementioned subunits of the digital signal processor may be communicatively and/or otherwise operably coupled with each other.

The location determinator may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determinator may include various sensors, a radar, and/or other specifically-purposed hardware elements for enabling the location determinator to acquire, measure, and/or otherwise transform location information of a computing device in which the location determinator is located or a different computing device.

The resource allocator may facilitate the determination, monitoring, analysis, and/or allocation of computing resources throughout the computing environment. As such, computing resources of the computing environment utilized by the digital signal processor, the memory unit, the I/O unit, and/or the communication unit (and/or any subunit of the aforementioned units) such as processing power, data storage space, network bandwidth, and/or the like may be in high demand at various times during operation. Accordingly, the resource allocator may be configured to manage the allocation of various computing resources as they are required by particular units and/or subunits of the computing environment (e.g., the digital signal processor). In some embodiments, the resource allocator may include sensors and/or other specially-purposed hardware for monitoring performance of each unit and/or subunit of the computing environment, as well as hardware for responding to the computing resource needs of each unit and/or subunit. In some embodiments, the resource allocator may utilize computing resources of a second computing environment separate and distinct from the computing environment to facilitate a desired operation. Therefore, in some embodiments any digital signal processor may be referred to as a load-balancing digital signal processor. Any apparatus described herein may be referred to as load-balancing apparatus or server. The term load-balancing may refer to allocation of computing resources to the various units of the computing environment.

For example, the resource allocator may determine a number of computing operations (e.g., graph manipulation, communication generation, etc.). The resource allocator may then determine that the number of computing operations meets and/or exceeds a predetermined threshold value. Based on this determination, the resource allocator may determine an amount of additional computing resources (e.g., processing power, storage space of a particular non-transitory computer-readable memory medium, network bandwidth, and/or the like) required by the digital signal processor, the memory unit, the I/O unit, the communication unit, and/or any subunit of the aforementioned units for enabling safe and efficient operation of the computing environment while supporting the number of simultaneous computing operations. The resource allocator may then retrieve, transmit, control, allocate, and/or otherwise distribute determined amount(s) of computing resources to each element (e.g., unit and/or subunit) of the computing environment and/or another computing environment. In some embodiments, the allocation of computing resources of the resource allocator may include the resource allocator flipping a switch, adjusting processing power, adjusting memory size, partitioning a memory element, transmitting and/or receiving signals and/or graphs and/or communications (or responses to communications), controlling one or more input and/or output devices, modifying various communication protocols, and/or the like. In some embodiments, the resource allocator may facilitate utilization of parallel processing techniques, e.g., for parallel computing operations. A computing operation may refer to any operation, function, method, process, etc., described in this disclosure.

In some embodiments, the memory unit may be utilized for storing, recalling, receiving, transmitting, and/or accessing various signals, signal attributes, graphs, or other information during operation of the computing environment. The memory unit may include various types of signal storage media such as solid state storage media, hard disk storage media, and/or the like. The memory unit may include dedicated hardware elements such as hard drives and/or servers, as well as software elements such as cloud-based storage drives. For example, the memory unit may include various subunits such as an operating system unit 232, an application unit 234, an application programming interface (API) unit 236, a signal storage unit 238 (for storing signals, signal attributes, communications, responses, etc.), a secure enclave 240, a cache storage unit 242, and a graph storage unit 244 (for storing graphs, portions of graphs, attributes or routes accessed from graphs, attribute changes or route changes for implementation on graphs, etc.). Any signals or graphs described herein may be associated with communications for transmission to computing devices.

The memory unit and/or any of its subunits described herein may include random access memory (RAM), read only memory (ROM), and/or various forms of secondary storage. RAM may be used to store volatile signals and/or to store instructions that may be executed by the digital signal processor. For example, the signals stored may be a command, a current operating state of the computing environment (or of a particular unit or sub-unit of the computing environment), an intended operating state of the computing environment (or of a particular unit or sub-unit of the computing environment), and/or the like. As a further example, signals stored in the memory unit may include instructions related to various methods and/or functionalities described herein. ROM may be a non-volatile memory device that may have a smaller memory capacity than the memory capacity of a secondary storage. ROM may be used to store instructions and/or signals that may be read during execution of computer instructions. In some embodiments, access to both RAM and ROM may be faster than access to secondary storage. Secondary storage may be comprised of one or more disk drives and/or tape drives and may be used for non-volatile storage of signals or as an over-flow signals storage device if RAM is not large enough to hold all working data. Secondary storage may be used to store programs that may be loaded into RAM when such programs are selected for execution. In some embodiments, the memory unit may include one or more databases for storing any signals and/or graphs and/or communications described herein. Additionally or alternatively, one or more secondary databases located remotely from the computing environment may be utilized and/or accessed by the memory unit.

The operating system unit may facilitate deployment, storage, access, execution, and/or utilization of an operating system utilized by the computing environment and/or any other computing environment described herein. In some embodiments, the operating system may include various hardware and/or software elements that serve as a structural framework for enabling the digital signal processor to execute various operations described herein. The operating system unit may further store various pieces of information and/or data associated with operation of the operating system and/or the computing environment as a whole, such as a status of computing resources (e.g., processing power, memory availability, resource utilization, and/or the like), runtime information, modules to direct execution of operations described herein, user permissions, security credentials, and/or the like.

The application unit may facilitate deployment, storage, access, execution, and/or utilization of an application utilized by the computing environment. For example, users may be required to download, access, and/or otherwise utilize a software application on a computing device such as a smartphone, tablet, or computing device, in order for various operations described herein to be performed. Information included in the application unit may enable a user to execute various computing operations described herein. The application unit may further store various pieces of information associated with operation of the application and/or the computing environment as a whole, such as a status of computing resources (e.g., processing power, memory availability, resource utilization, and/or the like), runtime information, modules to direct execution of operations described herein, user permissions, security credentials, and/or the like.

The API unit may facilitate deployment, storage, access, execution, and/or utilization of information associated with APIs of the computing environment. For example, the computing environment may include one or more APIs for enabling various input signal systems, computing devices, AI digital processing systems, applications, and/or computing environments to communicate with each other and/or perform operations on signals and/or graphs and/or communications. Accordingly, the API unit may include API databases comprising information that may be accessed and/or utilized by applications and/or operating systems of other devices and/or computing environments. In some embodiments, each API database may be associated with a customized physical circuit included in the memory unit and/or the API unit. Additionally, each API database may be public and/or private, and so authentication credentials may be required to access information in an API database. The signal storage unit may facilitate deployment, storage, access, and/or utilization of signals by any apparatus in the computing environment. The graph storage unit may facilitate deployment, storage, access, and/or utilization of graphs by any apparatus in the computing environment.

The secure enclave may facilitate secure storage of signals, signal attributes, or graphs. In some embodiments, the secure enclave may include a partitioned portion of storage media included in the memory unit that is protected by various security measures. For example, the secure enclave may be hardware secured. In other embodiments, the secure enclave may include one or more firewalls, encryption mechanisms, and/or other security-based protocols. Authentication credentials of a user may be required prior to providing the user access to signals and/or graphs and/or communications stored within the secure enclave.

The cache storage unit may facilitate short-term deployment, storage, access, analysis, and/or utilization of signals and/or graphs and/or communications. For example, the cache storage unit may serve as a short-term storage location for signals and/or graphs and/or communications so that the signals (or signal attributes associated with signals) and/or graphs and/or communications stored in the cache storage unit may be accessed quickly. In some embodiments, the cache storage unit may include RAM and/or other storage media types that enable quick recall of stored signals and/or graphs and/or communications. The cache storage unit may included a partitioned portion of storage media included in the memory unit.

Any aspect of the memory unit may comprise any collection and arrangement of volatile and/or non-volatile components suitable for storing signals and/or graphs and/or communications. For example, the memory unit may comprise random access memory (RAM) devices, read only memory (ROM) devices, magnetic storage devices, optical storage devices, and/or any other suitable data storage devices. In particular embodiments, the memory unit may represent, in part, computer-readable storage media on which computer instructions and/or logic are encoded. The memory unit may represent any number of memory components within, local to, and/or accessible by a processor.

The I/O unit may include hardware and/or software elements for enabling the computing environment to receive, transmit, and/or present signals and/or graphs and/or communications. For example, elements of the I/O unit may be used to receive, transmit, and/or present signals, and/or graphs, and/or communications, and/or the like. In this manner, the I/O unit may enable the computing environment to interface with a human user. As described herein, the I/O unit may include subunits such as an I/O device 244 and an I/O calibration unit 246.

The I/O device may facilitate the receipt, transmission, processing, presentation, display, input, and/or output of signals and/or graphs and/or communications as a result of executed processes described herein. In some embodiments, the I/O device may include a plurality of I/O devices. In some embodiments, the I/O device may include one or more elements of a data system, a computing device, a server, and/or a similar device.

The I/O device may include a variety of elements that enable a user to interface with the computing environment. For example, the I/O device may include a keyboard, a touchscreen, a touchscreen sensor array, a mouse, a stylus, a button, a sensor, a depth sensor, a tactile input element, a location sensor, a biometric scanner, a laser, a microphone, a camera, and/or another element for receiving and/or collecting input from a user and/or information associated with the user and/or the user's environment. Additionally and/or alternatively, the I/O device may include a display, a screen, a projector, a sensor, a vibration mechanism, a light emitting diode (LED), a speaker, a radio frequency identification (RFID) scanner, and/or another element for presenting and/or otherwise outputting data to a user. In some embodiments, the I/O device may communicate with one or more elements of the digital signal processor and/or the memory unit to execute operations described herein.

The I/O calibration unit may facilitate the calibration of the I/O device. For example, the I/O calibration unit may detect and/or determine one or more settings of the I/O device, and then adjust and/or modify settings so that the I/O device may operate more efficiently. In some embodiments, the I/O calibration unit may utilize a calibration driver (or multiple calibration drivers) to calibrate the I/O device.

The communication unit may facilitate establishment, maintenance, monitoring, and/or termination of communications between the computing environment and other devices such as input signal systems, computing devices, AI digital processing systems, other computing environments, third party server systems, and/or the like. The communication unit may further enable communication between various elements (e.g., units and/or subunits) of the computing environment. In some embodiments, the communication unit may include a network protocol unit 250, an API gateway 252, an encryption engine 254, and/or a communication device 256. The communication unit may include hardware and/or software elements.

The network protocol unit may facilitate establishment, maintenance, and/or termination of a communication connection between the computing environment and another device by way of a network. For example, the network protocol unit may detect and/or define a communication protocol required by a particular network and/or network type. Communication protocols utilized by the network protocol unit may include Wi-Fi protocols, Li-Fi protocols, cellular data network protocols, Bluetooth® protocols, WiMAX protocols, Ethernet protocols, powerline communication (PLC) protocols, Voice over Internet Protocol (VoIP), and/or the like. In some embodiments, facilitation of communication between the computing environment and any other device, as well as any element internal to the computing environment, may include transforming and/or translating signals and/or graphs and/or communications from being compatible with a first communication protocol to being compatible with a second communication protocol. In some embodiments, the network protocol unit may determine and/or monitor an amount of signal traffic to consequently determine which particular network protocol is to be used for transmitting and/or receiving signals and/or graphs and/or communications.

The API gateway may facilitate the enablement of other devices and/or computing environments to access the API unit of the memory unit of the computing environment. For example, a computing device may access the API unit via the API gateway. In some embodiments, the API gateway may be required to validate user credentials associated with a user of a computing device prior to providing access to the API unit to the user. The API gateway may include instructions for enabling the computing environment to communicate with another device.

The encryption engine may facilitate translation, encryption, encoding, decryption, and/or decoding of signals and/or graphs and/or communications received, transmitted, and/or stored by the computing environment. Using the encryption engine, each transmission of signals and/or graphs and/or communications may be encrypted, encoded, and/or translated for security reasons, and any received signals and/or graphs and/or communications may be encrypted, encoded, and/or translated prior to its processing and/or storage. In some embodiments, the encryption engine may generate an encryption key, an encoding key, a translation key, and/or the like, which may be transmitted along with any signals and/or graphs and/or communications. The key may need to be known by the recipient in order to read the signals and/or graphs and/or communications.

The communication device may include a variety of hardware and/or software specifically purposed to enable communication between the computing environment and another device, as well as communication between elements of the computing environment. In some embodiments, the communication device may include one or more radio transceivers, chips, analog front end (AFE) units, antennas, digital signal processors, memory, other logic, and/or other components to implement communication protocols (wired or wireless) and related functionality for facilitating communication between the computing environment and any other device. Additionally and/or alternatively, the communication device may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

It is contemplated that the computing elements be provided according to the structures disclosed herein may be included in integrated circuits of any type to which their use commends them, such as ROMs, RAM (random access memory), DRAM (dynamic RAM), and video RAM (VRAM), PROMs (programmable ROM), EPROM (erasable PROM), EEPROM (electrically erasable PROM), EAROM (electrically alterable ROM), caches, and other memories, and to microprocessors and microcomputers in all circuits including ALUs (arithmetic logic units), control decoders, stacks, registers, input/output (I/O) circuits, counters, general purpose microcomputers, RISC (reduced instruction set computing), CISC (complex instruction set computing) and VLIW (very long instruction word) processors, and to analog integrated circuits such as digital to analog converters (DACs) and analog to digital converters (ADCs). ASICS, PLAs, PALs, gate arrays and specialized processors such as digital signal processors (DSP), graphics system processors (GSP), synchronous vector processors (SVP), and image system processors (ISP) all represent sites of application of the principles and structures disclosed herein.

Implementation of any unit or sub-unit of any device described herein is contemplated in discrete components or fully integrated circuits in silicon, gallium arsenide, or other electronic materials families, as well as in other technology-based forms and embodiments. It should be understood that various embodiments of the invention can employ or be embodied in hardware, software, microcoded firmware, or any combination thereof. When an embodiment is embodied, at least in part, in software, the software may be stored in a non-volatile, machine-readable medium.

The computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Figure 3B:
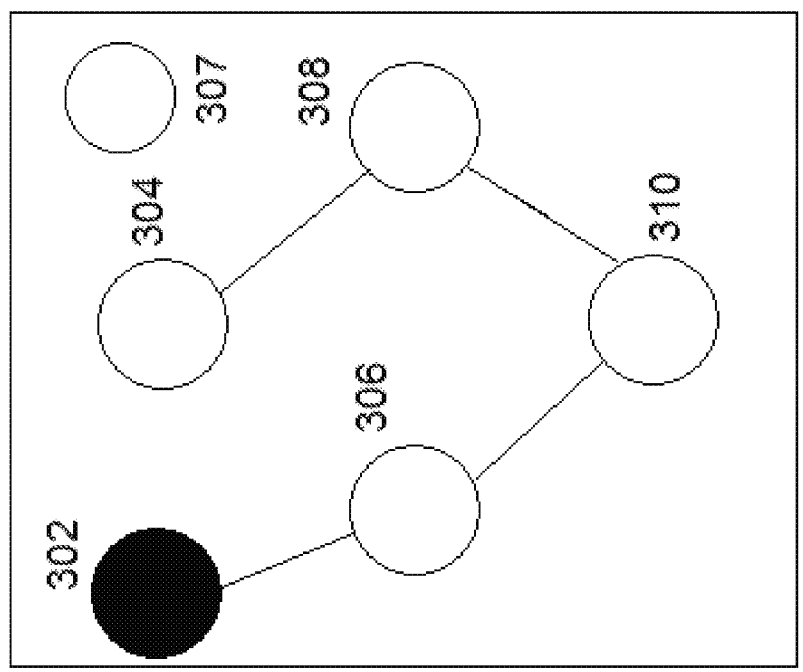
FIGS. 3A, 3B, 3C, and 3D are diagrams of graphs for AI communication generation in a complex computing network, in accordance with some embodiments of the invention.
Figure 3A:
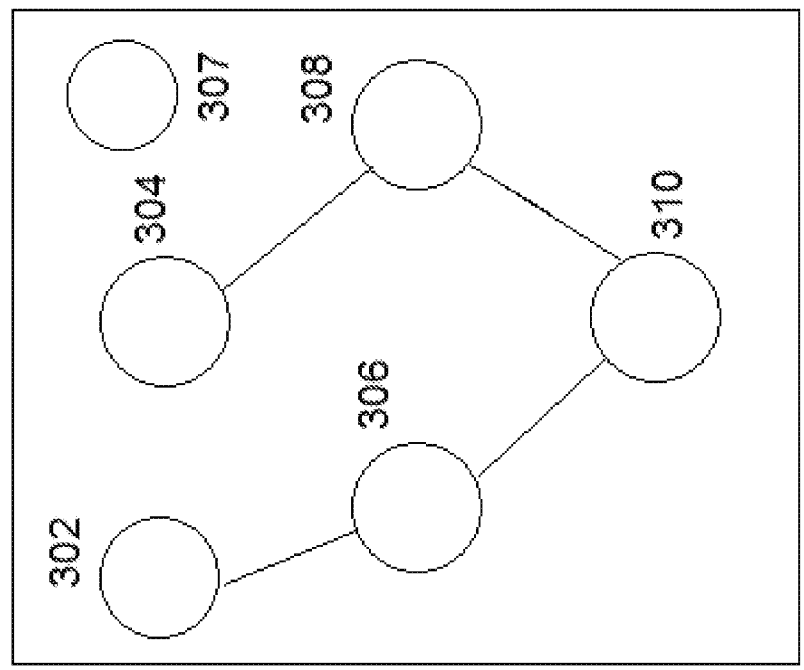

FIGS. 3A-3D are diagrams of graphs for AI communication generation for an input signal in a complex computing network, in accordance with some embodiments of the invention. In some embodiments, the term "graph" may also be referred to as a "map." FIG. 3A is a diagram of a graph with signal attributes and routes between signal attributes. The routes between signal attributes represent relationships (e.g., hierarchical relationships) between the signal attributes. FIG. 3B is a diagram of a graph associated with a first input signal when or after the first input signal is sensed by a signal sensor. In some embodiments, the graph of the first input signal may be dynamically created by merging the graph of FIG. 3A with information associated with signal attributes of the first input signal stored in a memory or sensed by the signal sensor. Alternatively or additionally, the graph of the first input signal may be stored in a memory. In some embodiments, a signal sensor senses that the first input signal has a first signal attribute 302. The sensor does not sense that the first input signal has a second signal attribute 308 or any of the other signal attributes 304 (intermediary signal attribute), 306, 307 (second intermediary signal attribute), and 310. In some embodiments, any signal attributes that are connected (e.g., directly connected) to each other on the graph may be related or are synchronous with each other. In some embodiments, any signal attributes that are connected (e.g., indirectly connected via one or more other intermediary signal attributes) to each other on the graph may be related or are synchronous with each other. In some embodiments, any signal attributes that are not connected (e.g., directly not connected) to each other on the graph may not be related or are asynchronous with each other. In some embodiments, any signal attributes that are not connected (e.g., indirectly not connected via one or more other intermediary signal attributes) to each other on the graph may not be related or are asynchronous with each other. As an example, in order for the input signal to have the signal attribute 306, the input signal needs to have the first signal attribute. However, for the input signal to have the first signal attribute, the input signal need not have the signal attribute 306. In some embodiments, if the response to a communication directed to determining whether the first input signal has signal attribute 306 is asynchronous with the first signal attribute, the system described herein may nullify the first signal attribute and/or the signal attribute 310 if it was previously determined for the first input signal and/or if the signal attribute 310 is asynchronous with the response.

In some embodiments, the connection between two signal attributes may be referred to as a route. In some embodiments, the route is unidirectional such that the sensing of the first signal attribute is necessary for preparing a communication directed to determining whether a connected signal attribute (e.g., the signal attribute 306) is present for the input signal, but the sensing of the connected signal attribute may not be used for preparing a communication directed to determining whether the first signal attribute is present for the input signal. In some embodiments, the route is bidirectional such that the sensing of the first signal attribute is necessary for preparing a communication directed to determining whether a connected signal attribute (e.g., the signal attribute 306) is present for the input signal, and the sensing of the connected signal attribute may also be used for preparing a communication directed to determining whether the first signal attribute is present for the input signal. In some embodiments, the various routes connected to a signal attribute may be stored as information in the signal attribute itself.

Figure 3D:
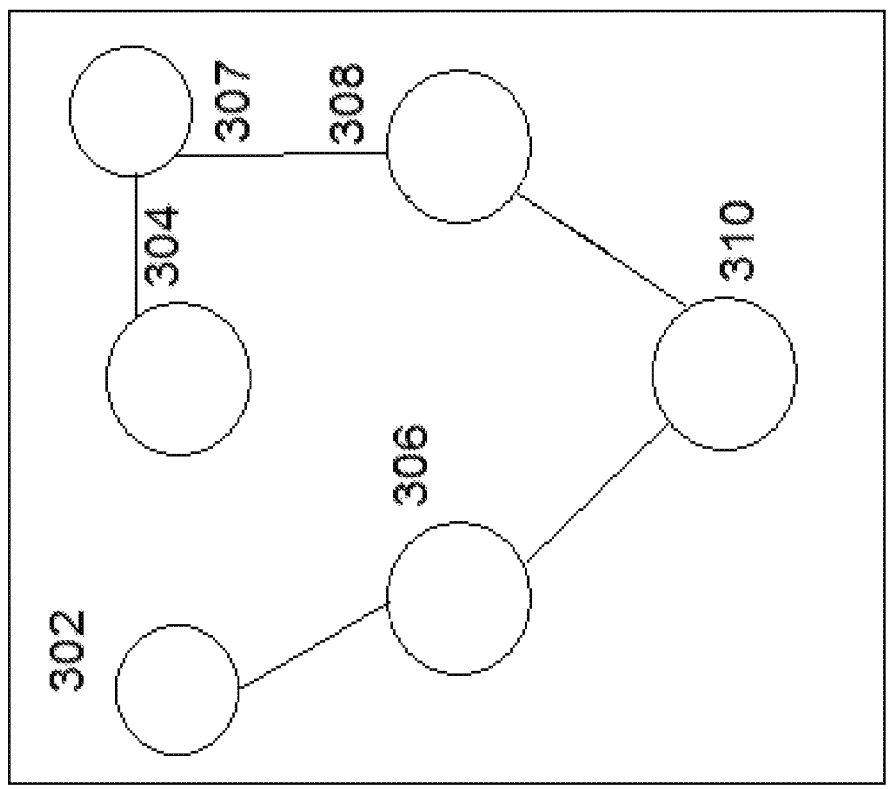
Figure 3C:
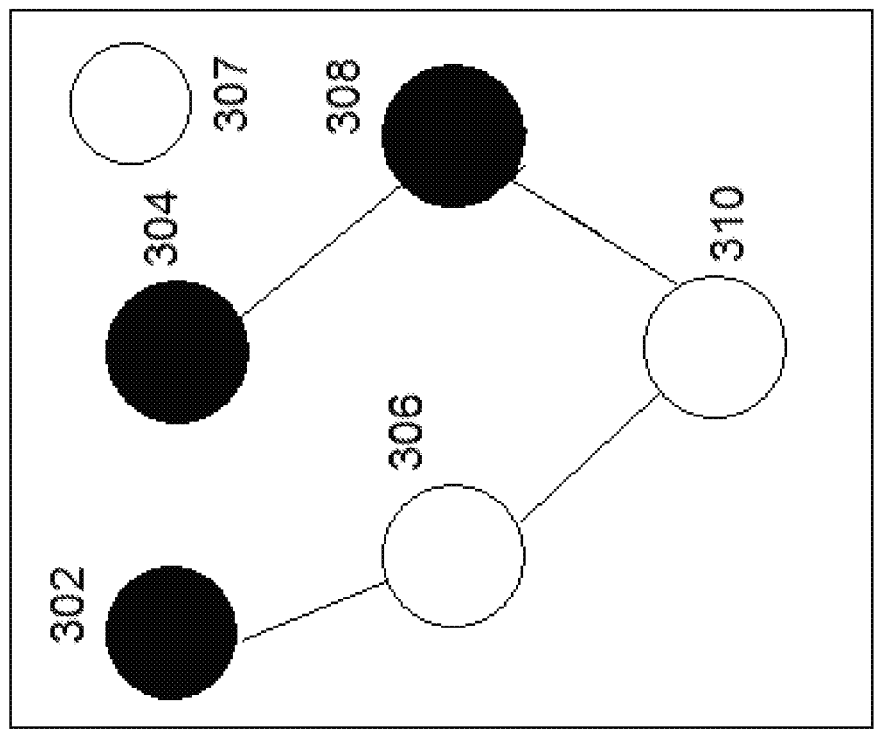
Figure 4A:
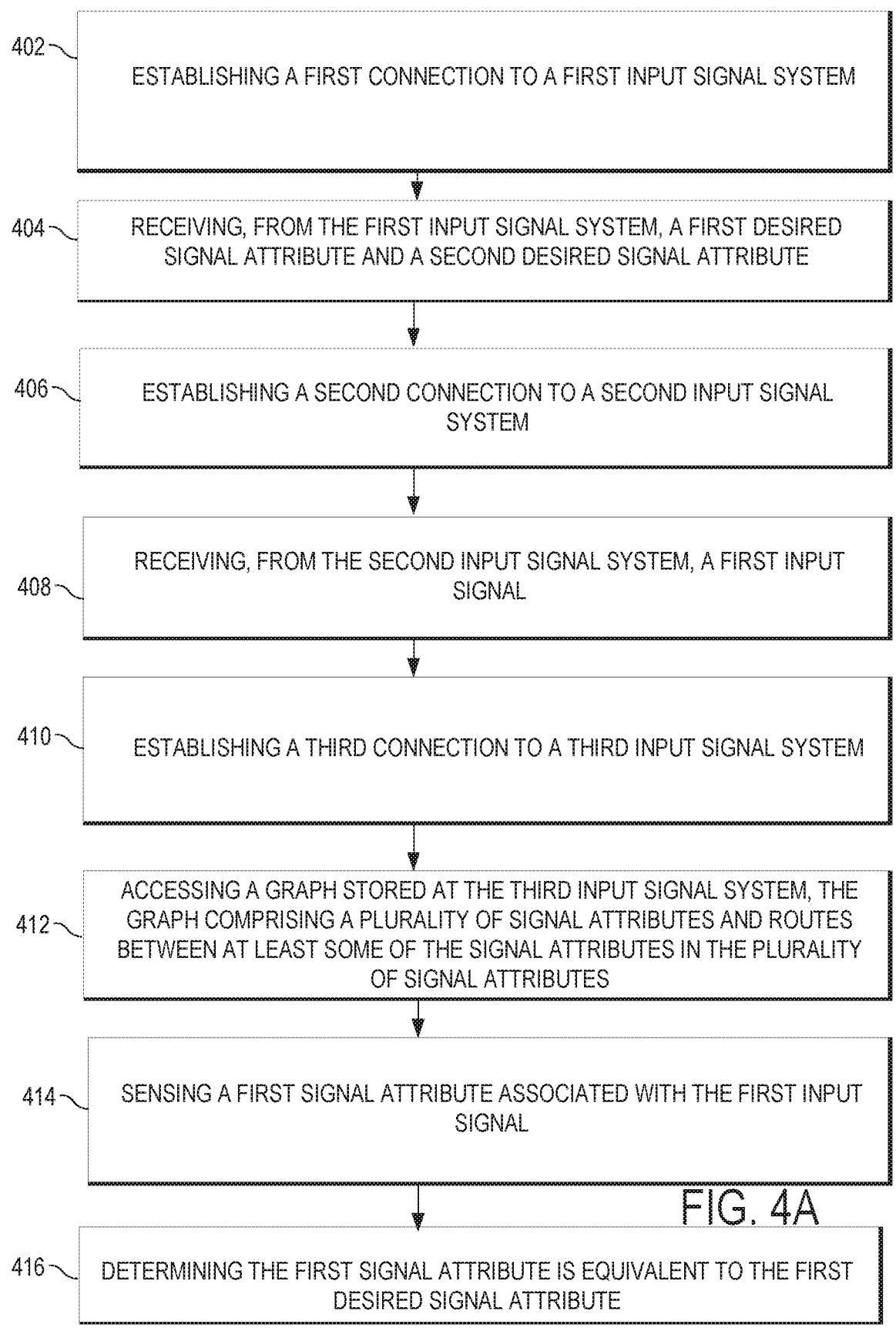

Referring now to FIG. 3C, in some embodiments, as discussed with respect to FIGS. 4A and 4B, a system described herein may not sense the second signal attribute for the first input signal. The second signal attribute may depend on the intermediary signal attribute. In some embodiments, the intermediary signal attribute may be referred to as the parent signal attribute and the second signal attribute may be referred to as the child signal attribute. Therefore, in order to determine whether the first input signal has the second signal attribute, a communication is generated for determining whether the first input signal has the intermediary signal attribute. If the response to the communication is negative, the first input signal cannot have the second signal attribute because it does not have the intermediary signal attribute. If the response to the communication regarding the intermediary signal attribute is positive, then a further communication is generated for determining whether the first input signal has the second signal attribute. In some embodiments, when the system determines that the first input signal has the intermediary signal attribute, the system may update the graph of the first input signal accordingly. In some embodiments, when the system determines that the first input signal has the second signal attribute, the system may update the graph of the first input signal accordingly. In some embodiments, a particular child signal attribute may have a single parent signal attribute, multiple parent signal attributes, or no parent signal attributes. In some embodiments, a particular parent signal attribute may have a single child signal attribute, multiple child signal attributes, or no child signal attributes.

Referring now to FIG. 3D, in some embodiments, the system modifies the graph of FIG. 3A such that the intermediary signal attribute is connected to the second intermediary signal attribute which is in turn connected to the second signal attribute. Implementing this modification to the graph dynamically modifies in real-time communications that depend on the route between the intermediary signal attribute and the second signal attribute in the unmodified graph. This means that communications do not need to be individually modified, manipulated, or programmed to account for the modification of the graph. In some embodiments, an affected communication may be modified before the communication is transmitted to a computing device associated with the input signal. In some embodiments, the affected communication may be modified either during or after the transmission of the communication to the computing device, but before the communication is responded to by the computing device. In some embodiments, if the communication is responded to by the computing device, the response is nullified and a communication based on the modified route between the intermediary signal attribute and the second signal attribute is transmitted to the computing device. Any modification of the graph described herein may refer to modification of a route on the graph, modification of a signal attribute on the graph (e.g., adding, deleting, or modifying information that is comprised in or defined as the signal attribute), addition of a signal attribute on the graph, deletion of a signal attribute on the graph, etc. Any modification of the graph may dynamically cause one or more communications to be modified in real-time before, during, or after generation of, transmission to, or presentation of the communication to the computing device.

In some embodiments, the modification of the graph may comprise applying a translation (e.g., natural language translation, computing language translation, etc.) to or including a translation option on the signal attributes or routes on the graph. Such a modification may cause the communication to be generated in or translated into an available language selected by a user of the graph or the computing device that receives the communication (e.g., before or after the communication is received by the computing device) or in an available language (or default language) associated with the location of the computing device associated with the input signal (e.g., French in France, German in Germany, etc.).

FIGS. 4A and 4B are block diagrams of a method for AI communication generation by traversing routes of a graph in a complex computing network, the intelligent communication generation being used for determining whether an input signal has desired signal attributes, the intelligent communication generation and the traversing of the graph being rooted in computing technology. The various blocks of FIGS. 4A and 4B may be executed in a different order from that shown in FIGS. 4A and 4B. Some blocks may be optional. In some embodiments, each of the various blocks of 4A and 4B may be performed by different systems presented in FIG. 1 or any of the units, subunits, and/or elements presented in FIG. 2, or any combination thereof. In some embodiments, the various blocks of 4A and 4B may be performed wholly by any one of the systems presented in FIG. 1 or any of the units, subunits, and/or elements presented in FIG. 2.

At block 402, the method comprises establishing a first connection to a first input signal system. At block 404, the method comprises receiving, from the first input signal system, a first desired signal attribute and a second desired signal attribute. Alternatively, the method, at block 404, comprises receiving, from the first input signal system, a request for input signals (e.g., for constituting an input signal panel) having the first desired signal attribute and the second desired signal attribute. At block 406, the method comprises establishing a second connection to a second input signal system. At block 408, the method comprises receiving, from the second input signal system, a first input signal. The first input signal may be associated with one or multiple entities, one or multiple computing devices, one or multiple users, etc.

At block 410, the method comprises establishing a third connection to a third input signal system. At block 412, the method comprises accessing a graph stored at the third input signal system. The third input signal system may comprise a single system or multiple systems connected to each other. The graph may be stored in one or memories located in the one or more systems. For example, at least part of the graph may be stored in a memory that can be accessed faster than a different portion of the graph. The graph comprises a plurality of signal attributes and routes between at least some of the signal attributes from among the plurality of signal attributes. In some embodiments, the graph may be associated with a particular input signal such as the first input signal. In some embodiments, the graph may include graphs associated with multiple disparate input signals.

At block 414, the method comprises sensing a first signal attribute associated with the first input signal. As used herein, the term sensing may refer to identifying, determining, etc. In some embodiments, the sensing may be executed by a signal sensor. In some embodiments, the first signal attribute is filled for the first input signal on the graph based on a response to a previous communication transmitted to a computing device associated with the first input signal. In some embodiments, the first signal attribute is sensed based on accessing the graph (e.g., a customized graph associated with the first input signal that is generated based on combining the known signal attributes associated with the first input signal and the graph). At block 416, the method comprises determining the first signal attribute is equivalent to the first desired signal attribute. The equivalence may be determined using a signal matcher. At block 418, the method comprises determining, for the first input signal, a second signal attribute not sensed by the signal sensor. The second signal attribute is equivalent to the second desired signal attribute. In some embodiments, the signal sensor sensing the second signal attribute may be different from the signal sensor sensing the first signal attribute.

At block 420, the method comprises generating a first communication for transmission to the first computing device associated with the first signal. In some embodiments, the first communication or any other communication may comprise an electronic survey or one or more questions of the electronic survey. For example, the first communication may comprise a first question. In some embodiments, the term "question" may comprise one or more questions. In some embodiments, multiple questions may together form an electronic survey. In some embodiments, the survey may be a physical survey that is rendered on a physical medium such as paper. A computing device may refer to a physical computing device or a network address such as an email address, a phone number, an Internet Protocol (IP) address, etc. In some embodiments, a computing device associated with an input signal may be accessed using a routing signal. Any communication described herein may be presented on the computing device. In some embodiments, the first communication may be based on the first signal attribute (present or known for the first input signal) or the second signal attribute (not present or known for the first input signal).

In some embodiments, the first communication may be based on a set of known and/or unknown signal attributes and not based on other known and/or unknown signal attributes. Additionally or alternatively, the first communication may be based on known or unknown signal attributes for the first input signal based on referring to the graph associated with the first input signal. For example, the first communication may be a question whose answer will directly determine whether the second signal attribute is present for the first input signal. As a further example, the communication may be a question whose answer will determine an intermediary question that will lead to determining whether the second signal attribute is present for the first input signal. In some embodiments, the first communication may also be determined by referring the graph. Any reference to graph may be a reference to a global graph associated with multiple input signals, or a customized graph associated with a particular input signal such as the first input signal. The graph may determine the type and number of questions that need to be answered in order to determine whether the second signal attribute is present for the first input signal. In some embodiments, the first communication may be generated such that a response to the first communication may be used to determine (e.g., for the first time) an unfilled signal attribute for the first input signal on the graph. In some embodiments, the first communication may be generated such that a response to the first communication may be used to determine or confirm a previously determined or filled signal attribute for the first input signal on the graph.

At block 422, the method comprises transmitting the first communication to the first computing device. Any transmission or reception may occur using any short-range (e.g., Bluetooth, Bluetooth Low Energy, near field communication, Wi-Fi Direct, etc.) or long-range communication mechanism (e.g., Wi-Fi, cellular, etc.). At block 424, the method comprises receiving a first response to the first communication from the first computing device. In some embodiments, the first response may be received from a different computing device other than the first computing device. At block 426, the method comprises determining, based on the first response to the first communication, an intermediary signal attribute for the first signal. In some embodiments, the response may comprise the intermediary signal attribute. In some embodiments, if the intermediary signal attribute is compared to the second signal attribute and determined to be equivalent to the second signal attribute, the method may stop here. However, in some embodiments, the intermediary signal attribute is not the second signal attribute. In some embodiments, the intermediary signal attribute may not be connected directly to a known signal attribute associated with the first input signal (e.g., the first signal attribute) on the graph. In some embodiments, the intermediary signal attribute may not be connected indirectly, via one or more routes, to the known or determined signal attribute on the graph. In some embodiments, the intermediary signal attribute may be connected directly or indirectly to the known or determined signal attribute on the graph.

In some embodiments, the method may further comprise determining whether the intermediary signal attribute (or any other known signal attribute associated with the first input signal) is asynchronous (or in conflict with) with the first signal attribute. In response to determining the intermediary signal attribute is asynchronous with the first signal attribute, the method further comprises nullifying the first signal attribute (or other asynchronous signal attributes) associated with the first input signal. Therefore, in some embodiments, the method may further comprise nullifying signal attributes related to the first signal attribute. The nullification of the signal attributes may be implemented into the graph associated with the first input signal. In some embodiments, the method may comprise determining whether the intermediary signal attribute is asynchronous with the second signal attribute. In response to determining the intermediary signal attribute is asynchronous with the second signal attribute, the method may stop and not proceed any further.

At block 428, the method comprises generating, based on a route connecting, either directly or indirectly, the intermediary signal attribute with the second signal attribute on the graph, a second communication for transmission to the first computing device. In some embodiments, the second communication is generated in real-time after the first response is received from the first computing device or a different computing device. In some embodiments, the second communication may comprise a second question different from the first question. In some embodiments, the second question may be a question regarding the response to the first question. In some embodiments, the second communication may be based on the first signal attribute (present or known for the first input signal) or the second signal attribute (not present or known for the first input signal). Additionally or alternatively, the second communication may be based on other known or unknown signal attributes for the first input signal based on referring to the graph associated with the first input signal. For example, the communication may be a question whose answer will directly determine whether the second signal attribute is present for the first input signal. As a further example, the communication may be a question whose answer will determine an intermediary question that will lead to determining whether the second signal attribute is present for the first input signal. As explained herein, in some embodiments, the second communication may also be determined by referring the graph. The graph may determine the type and number of questions that need to be answered in order to determine whether the second signal attribute is present for the first input signal. In some embodiments, the second communication may be generated such that a response to the second communication may be used to determine (e.g., for the first time) an unfilled signal attribute for the first input signal on the graph. In some embodiments, the second communication may be generated such that a response to the second communication may be used to determine or confirm a previously determined or filled signal attribute for the first input signal on the graph.

At block 430, the method comprises transmitting the second communication to the first computing device. In some embodiments, the second communication is transmitted to the first computing device (or presented on the first computing device) in real-time after the first response is received from the first computing device or a different computing device. At block 432, the method comprises receiving a second response to the second communication from the first computing device. In some embodiments, the response may comprise or lead to the determination of the second signal attribute. At block 434, the method comprises determining, based on a second response to the second communication, that the second signal attribute is associated with the first input signal, i.e., that the first input signal has the second signal attribute. In some embodiments, this determination may be transmitted to the first input signal system that requested input signals that have the first desired signal attribute (equivalent to the first signal attribute) and the second desired signal attribute (equivalent to the second signal attribute). In some embodiments, identification information or attributes associated with the input signal may be transmitted to the first input signal system.

In some embodiments, a response at block 424 or 432 may comprise no response. In such embodiments, the communication may be transmitted again to the first computing device. Alternatively, in such embodiments, a modified or different communication may be transmitted to the first computing device. In some embodiments, the first communication and/or the second communication may be generated based on fuzzy logic. In some embodiments, the term "modify" or "modification" may be interchangeably used with the term "transform" or "transformation."

In some embodiments, the first and second communications may be generated based on the routes of the graph and transmitted to the computing device as a single communication (e.g., for presenting on a single page of a computing device). As an example, the graph indicates that positive determination of a second signal attribute associated with the second communication is dependent on positive determination of an intermediary signal attribute associated with the first communication. The flow of presentation of the communications on the computing device may be based on the routes of the graph (e.g., the first communication may be presented on a previous screen, before, or above the first communication). In some embodiments, the responses to the first and second communications may be received together as a single communication from the computing device. The responses may be analyzed by the system described herein in sequential order based on the graph (e.g., response to first communication before response to second communication) to determine whether the input signal has the intermediary signal attribute and the second signal attribute. If the input signal does not have the intermediary signal attribute, the analysis may stop and not proceed to determining whether the input signal has the second signal attribute. In other embodiments, even if the input signal does not have the intermediary signal attribute, the analysis may still proceed to determining whether the input signal has the second signal attribute.

In some embodiments, the first input signal system, the second input signal system, the computing device, the AI digital processing system and any other system, server, apparatus, or computing device may refer to or comprise a database such as a relational database. Any input signal described herein may be referred to as just a signal. Any input signal may comprise identification signal attributes associated with a user (e.g., name, address, email address, age, employment history, list of relatives, etc.). In some embodiments, the first input signal may comprise behavioral signal attribute associated with a user (e.g., user rides a bike twice a week, user goes fishing once a week, etc.). The behavioral signal attributes may either be self-reported by a user or determined based on monitoring a user's activity (e.g., computing device activity, computing transaction activity, event attendance history, etc.). In some embodiments, the signal attributes may comprise purchase transaction or membership history associated with the user for a particular entity. Any electronic survey described herein may comprise one or more questions for prompting answers by a user. In some embodiments, the survey may be a physical survey that is filled out on paper or other material by a user. Additionally or alternatively, the survey may not be a self-reporting survey such that answers to survey questions are automatically determined based on a user's digital behavior (e.g., browsing history, digital shopping habits, advertisement clicking history, time spent on certain sites, search history, etc.). A response to the survey may include answers to questions in the survey. The response may also not include answers to some questions in the survey, e.g., when the user did not answer some questions or when enough information could not be determined to answer a survey question.

A routing signal may refer to contact information associated with the user. For example, the routing signal may refer to a network address such as an email address. A signal sensor may be a data sensor. Any input signal system, computing device, or routing signal described herein may refer to an address (e.g., a network address such as an email address an IP address) associated with the device or a user of the device. In some embodiments, any communication may be transmitted to a first computing device, and a response to the communication may be received from a different computing device. The term "signal" may refer to a single signal or multiple signals. The term "signals" may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc.

In some embodiments, a signal attribute may be a volatile attribute. This means that the attribute may be associated with a period of validity. For example, a communication transmitted to a user (e.g., corresponding to an input signal) may prompt the user to respond with the identity of the user's mobile device. The user's response may be translated into a signal attribute on the user's graph. This signal attribute may be associated with a period of validity (e.g., a few days, months, years, etc.). Either prior to or upon expiration of the period of validity, one or more transmission may be generated either to directly prompt the user to respond with the identity of the user's mobile device or indirectly prompt the user to respond with the identity of the user's mobile device via one or more intermediary prompts that prompt the user to define intermediary signal attributes associated with the user's graph. In some embodiments, the prompt may be an automatic prompt such that the user's mobile device automatically responds to the prompt by providing identity information associated with the mobile device (e.g., the type of mobile device) without user intervention.

In some embodiments, a signal attribute may be a derived signal attribute. As described herein, some of the signal attributes on a graph associated with an input signal (e.g., associated with a user) may be based on responses to communications transmitted to computing devices associated with the input signal. Other signal attributes may be determined from such known signal attributes. For example, a user's age may be derived from a user's date of birth, which is received from the computing device associated with the user in response to a communication transmitted to the computing device.

In some embodiments, a signal attribute on a graph may comprise metadata. For example, the metadata may comprise language translation information associated with a communication associated with the signal attribute. The metadata may be accessed either prior to or at the time of generating the communication. For example, the communication may be dynamically generated using the metadata and based on certain factors, e.g., location of user or computing device receiving the communication, language of preference associated with the user, computing device, or location, etc., receiving the transmission, etc.

In some embodiments, the responses to the communications described herein may be used to determine whether to place a user (or input signal) associated with the responses on a particular panel (e.g., a survey panel). If, based on the responses, the user qualifies for the panel, a survey formulated for the survey panel may be transmitted to the user or a computing device associated with the user. In some embodiments, a computing device associated with the user may refer to a routing signal associated with the user (e.g., an email address, a network address, a phone number, etc.). In some embodiments, the graphs associated with multiple users (or input signals) may be used to empanel the users. For example, if a panel needs to be formed for users owning a certain type of mobile device, this attribute may be obtained from the graphs associated with the users. If any user's attribute is missing (e.g., for type of mobile device), one or more communications may be generated and transmitted to a computing device associated with the user in order to fill in the missing attribute on the user's graph. Users who have a certain type of mobile device may be filtered into the panel, and one or more communications (e.g., survey questions) may be generated and transmitted to the users according to the embodiments described herein.

This disclosure claims priority to and incorporates by reference U.S. Provisional Application 62/146,483, filed Apr. 13, 2015, titled "Systems and Methods for Automated Survey Programming and Rewards Management in a Multi-Channel Platform Environment," in its entirety for all purposes.

The present disclosure additionally relates to sensing whether an input signal qualifies for authentication. The system (e.g., the AI digital processing system) attaches a relative value to one or more types of input signals based on signal attributes and authentication qualifiers. The authentication for responding to a communication described herein may be, in turn, optimized based on the relative value of a given input signal. In some embodiments, a method may be provided for authenticating an input signal. The method may begin with performing an initial data capture of signal attributes for input signals. The method continues with establishing at least one authentication qualifier. Each authentication qualifier may be associated with a particular signal attribute that is desirable for an input signal for various reasons. The authentication qualifiers may be stored in any memory described herein. The method continues with applying the authentication qualifier to input signals. The method continues with associating a relative value with each input signal, based on the applied authentication qualifier. In an example, the relative value relates to the natural incidence of certain types of input signals (e.g., with certain signal attributes), with input signals that are most valued and/or rare for receiving the communications described herein, wherein the communications themselves may have the highest relative value. The method continues with issuing one or more authentications to the input signals based on the relative value associated with each input signal. In another example, the authentication may increase in value the more communications that are responded to by a computing device associated with an input signal. In an embodiment, the relative value of a given input signal may vary depending on which overall panel or set of input signals it is being considered within. In an embodiment, the relative value of an input signal is updated in substantially real-time when a communication is prepared for or transmitted to a computing device associated with the input signal. As used herein, an input signal may be a user. In some embodiments, authenticating an input signal may refer to providing a reward to the user. In some embodiments, a panel of input signals may also be referred to as a set of input signals.

The present disclosure provides a system (e.g., the AI digital signal processing system) that enables interaction with computing devices associated with input signals according to the channels employed by the computing devices to interact with the system. As used herein, a channel is defined by type and/or characteristics of an electronic data connection by which the system interacts with computing devices, whether to enroll the input signals associated with the computing devices, transmit offers to the computing devices (e.g., in one or more panels), generate and transmit communications to computing devices, and/or authenticate the input signals. One example of such a channel is a web site domain by which a computing devices interacts with the system. Another example of such a channel is a web application by which a computing device interacts with the system. A further example of such a channel is a mobile channel defined by a mobile service and/or characteristics of a mobile computing device to interact with the system. Examples of mobile device characteristics may include mobile device type, mobile device location, user preferences, and/or mobile application employed to interact with the system.

Based on the channel employed by a computing device, the system may select a language, a template, themes and skins, and a brand to be used in presenting content to the computing device and requesting information from the computing device. The content to be presented and the information to be requested from the computing device may also be selected based on the channel employed by the computing device. In some embodiments, the content to be presented and the information to be requested from the computing device may also be based on the location of the computing device.

In some embodiments, a multi-channel content management method may be carried out by an AI digital signal processing system (e.g., comprising a digital signal processor) described herein. The method may begin by accessing communication qualifiers for interacting with computing devices associated with one or more input signals according to one or more channels employed by the one or more computing devices. For example, the method may include selecting a language (e.g., natural language, computing language, etc.) to use in communicating with the computing device based on a channel employed by the computing device. Additionally, the method may include selecting a template for interacting with the computing device based on the channel employed by the computing device. Also, the method may include selecting a theme and/or skin for interacting with the computing device based on the channel employed by the computing device. Further, the method may include selecting a brand for interacting with the computing device associated with the input signal based on the channel employed by the computing device. Even further, the method may include selecting content for presentation on the computing device based on the channel employed by the computing device. Yet further, the method may include selecting information to be requested from the computing device based on the channel employed by the computing device.

In some embodiments, the system may register an input signal according to the channel employed by the computing device associated with the input signal. During the process of registration, the system may employ the languages, templates, themes and skins, brands, content, and information to be requested that was selected earlier in the method. As part of the registration process, the system may assign an identification attribute to the input signal, and obtain information regarding demographics and/or preferences of a user associated with the input signal. Additionally, the method may include recording qualifiers for empaneling the input signals by storing this information in memory in association with the identification attributes of the input signals. In some embodiments, the method may further comprise recording qualifiers for transmitting offers (e.g., authentication offers) and authenticating the input signals in association with the identification attributes associated with the input signals.

In some embodiments, the system may interact with the computing devices according to communication qualifiers for interacting with the computing devices. In some embodiments, the method may include interpreting or determining the communication qualifiers for interacting with the computing devices according to the one or more channels employed by the computing devices. This method may involve determining one or more locations associated with the one or more channels and/or the one or more computing devices, and determining the communication qualifiers based on the locations. In some embodiments, the method may additionally include modifying an offer (e.g., an authentication offer) previously communicated to the computing devices to comply with the communication qualifiers. This process may involve modifying the offer to comply with the location of the computing device and/or the location and/or type of channel. In some embodiments, the method may further comprise transmitting the modified offer to the computing device. During the tendering of offers, the method may include selecting languages, templates, themes and skins, brands, and content based on the channels employed by the computing devices, and employing the selected languages, templates, themes and skins, brands, and content during the tendering of the offers. Further, the method may include authenticating the input signals associated with the computing devices according to authentication qualifiers. During the authenticating process, the method may include selecting languages, templates, themes and skins, brands, and content based on the channels employed by the computing devices, and employing the selected languages, templates, themes and skins, brands, and content during the authenticating process. Alternatively or additionally, the method may include transmitting or collecting resources (e.g., financial or monetary resources or assets) for the input signals in accordance with the location of the computing device and/or the channel.

In some embodiments, another multi-channel content management method may be carried out by the system described herein. The system may access empaneling qualifiers for input signals. It is envisioned that each input signal panel may have a set of qualifiers for the input signals. An exemplary qualifier for a user associated with an input signal may be a demographics qualifier. In some embodiments, the system may access qualifiers and authenticate input signals according to channels employed by the computing devices associated with the input signals. For example, the method may include accessing qualifiers stored in memory. Example qualifiers may include location-based qualifiers, channel-based qualifiers, user preferences, etc.

In some embodiments, the system may enroll the input signals according to channels employed by the computing devices. The system may enroll the input signals according to the channels employed by the computing devices. For example, the system may assign identification attributes, obtain input signal information, and record any information as previously described. Additionally, the method may include recording relationships, such as pointers, between the identification attributes and data objects corresponding to qualifiers (any qualifiers described herein) for the channels respectively employed by the computing devices. It is further envisioned that, in some implementations, the method may include determining input signal panels for which the input signals qualify, and recording relationships, such as pointers, between the identification attributes and the input signal panels.

The method may further comprise empaneling the input signals based on empaneling qualifiers. For example, the method may include determining input signal panels for which the input signal qualifies, and placing the input signal on one or more of the input signal panels. Alternatively, in implementations in which the eligibility of input signals to serve on panels has already been recorded, the method may include selecting a particular input signal panel or subset of panels for which the input signal is eligible, and recording the corresponding relationships in memory in association with identification attributes associated with the input signals.

The method may further comprise receiving changes to one or more of the qualifiers (e.g., stored in memory). For example, changes may be made to qualifiers in one or more of the qualifier categories, such as location-based categories, channel-based categories, input signal preferences, etc. Alternatively or additionally, changes may be made to the qualifiers required by a particular input signal panel, and/or new input signal panels may be added that have criteria of their own.

In some embodiments, the system may make a determination whether the changes to qualifiers impact the empanelment of the input signals. The method may include determining that changes were made to criteria of input signal panels, and/or that new input signal panels were added. If it is determined that changes were made that impact the empanelment, then processing may proceed to re-empaneling the input signals. However, if it is determined that changes were not made that impact the empanelment, then processing may proceed to tendering or transmitting authentication offers to computing devices associated with the input signals and authenticating the input signals according to the channels employed by the computing devices associated with the input signals.

In some embodiments, the input signals may be re-empaneled. For example, if changes were made to qualifiers of an existing input signal panel, then the method may include determining whether each input signal assigned to that input signal panel is still eligible to be on the input signal panel, and removing ineligible input signals from the input signal panel. These input signals may then be assigned to serve on other input signal panels for which they are eligible. Eligibility of other input signals to serve on the input signal panel may also be assessed, and new input signals may be assigned to the input signal panel. Alternatively or additionally, if a new input signal panel was added, then eligibility of input signals to qualify for that input signal panel may be determined, and one or more of the eligible input signals may be assigned to the input signal panel. Input signals assigned to the new input signal panel may be removed from one or more other input signal panels, and the other input signal panels may then be reevaluated, if needed.

In some embodiments, the system may transmit authentication offers to computing devices associated with the input signals and authenticate the input signals according to the channels employed by the computing devices associated with the input signals. For example, the system may employ identification attributes to reference the qualifiers stored in memory and have relationships recorded in association with the identification attributes. As a result, the system may select languages, templates, themes and skins, brands, and content based on the channels employed by the computing devices, and employ the selected languages, templates, themes and skins, brands, and content during the transmission or presentation of the authentication offers and the authentication of the input signals. Alternatively or additionally, the method may include transmission or receipt of resources in accordance with location-based qualifiers associated with the channel employed by the computing device associated with the input signal. In some embodiments, the various methods described herein may be used to determine more signal attributes or more information associated with signal attributes for the input signals described herein.

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:

1. A method for communication generation, based on traversing routes of a graph, in a complex computing network, the method comprising:

establishing a first connection to a first input data system;

receiving, from the first input data system, a first desired data attribute and a second desired data attribute;

establishing a second connection to a second input data system;

receiving, from the second input data system, first input data;

establishing a third connection to a third input data system or the second input data system;

accessing a graph stored at the third input data system or the second input data system, the graph comprising a plurality of data attributes and routes among at least some data attributes in the plurality of data attributes;

sensing, using one or more computing device processors, a first data attribute associated with the first input data;

determining, using the one or more computing device processors, the first data attribute is equivalent to the first desired data attribute;

sensing, using the one or more computing device processors, a second data attribute associated with the first input data;

determining, using the one or more computing device processors, the second data attribute is equivalent to the second desired data attribute;

determining, using the one or more computing device processors, an intermediary data attribute on the graph, wherein a first route connects, either directly or indirectly, the intermediary data attribute to the first data attribute on the graph, and wherein a second route connects, either directly or indirectly, the intermediary data attribute to the second data attribute on the graph;

determining, using the one or more computing device processors, a period of validity associated with the intermediary data attribute has expired;

in response to determining the period of validity associated with the intermediary data attribute has expired, generating, using the one or more computing device processors, and based on the intermediary data attribute, a first communication for transmission to a first computing device;

transmitting, using the one or more computing device processors, the first communication to the first computing device;

receiving, using the one or more computing device processors, a first response, to the first communication, from the first computing device;

determining, based on the first response to the first communication, using the one or more computing device processors, a new intermediary data attribute associated with the first input data;

determining, using the one or more computing device processors, whether the new intermediary data attribute associated with the first input data is consistent or inconsistent with the intermediary data attribute associated with the first input data; and determining, based on the new intermediary data attribute associated with the first input data being consistent or inconsistent with the intermediary data attribute associated with the first input data, whether to nullify or invalidate the first data attribute or the second data attribute associated with the first input data.

2. The method of claim 1, wherein the second data attribute is a parent of the intermediary data attribute.

3. The method of claim 2, wherein the intermediary data attribute is a parent of the first data attribute.

4. The method of claim 3, wherein determining, based on the new intermediary data attribute associated with the first input data being consistent or inconsistent with the intermediary data attribute associated with the first input data, whether to nullify or invalidate the first data attribute or the second data attribute associated with the first input data comprises determining, based on the new intermediary data attribute associated with the first input data being consistent or inconsistent with the intermediary data attribute associated with the first input data, whether to nullify or invalidate the first data attribute associated with the first input data.

5. The method of claim 1, wherein nullifying or invalidating the first data attribute or the second data attribute associated with the first input data causes at least some data attributes associated with the first input data to be nullified or invalidated.

6. The method of claim 5, further comprising transmitting at least one communication to the first computing device, the at least one communication associated with the at least some nullified or invalidated data attributes.

7. The method of claim 1, wherein the first data attribute or the second data attribute is sensed based on accessing the graph.

8. The method of claim 1, wherein the first computing device comprises one or more computing devices associated with a user associated with the first response.

9. A method for communication generation, based on traversing routes of a graph, in a complex computing network, the method comprising:
establishing a first connection to a first input data system;
receiving, from the first input data system, a first desired data attribute;
establishing a second connection to a second input data system;
receiving, from the second input data system, first input data;
establishing a third connection to a third input data system or the second input data system;
accessing a graph stored at the third input data system or the second input data system, the graph comprising a plurality of data attributes and routes among at least some data attributes in the plurality of data attributes;
sensing, using one or more computing device processors, a first data attribute associated with the first input data;
determining, using the one or more computing device processors, the first data attribute is equivalent to the first desired data attribute;
determining, using the one or more computing device processors, an intermediary data attribute on the graph, wherein a route connects, either directly or indirectly, the intermediary data attribute to the first data attribute on the graph;
determining, using the one or more computing device processors, a period of validity associated with the intermediary data attribute has expired;
in response to determining the period of validity associated with the intermediary data attribute has expired, generating, using the one or more computing device processors, based on the intermediary data attribute, a first communication for transmission to a first computing device;
transmitting, using the one or more computing device processors, the first communication to the first computing device;
receiving, using the one or more computing device processors, a first response, to the first communication, from the first computing device;
determining, based on the first response to the first communication, using the one or more computing device processors, a new version of the intermediary data attribute associated with the first input data; and
determining, based on the new version of the intermediary data attribute associated with the first input data, using the one or more computing device processors, whether to nullify or invalidate the first data attribute associated with the first input data.

10. The method of claim 9, further comprising, nullifying or invalidating, using the one or more computing device processors, and based on the new version of the intermediary data attribute being inconsistent with a previous version of the intermediary data attribute, the first data attribute associated with the first input data.

11. The method of claim 9, wherein the intermediary data attribute is a parent of the first data attribute.

12. The method of claim 9, wherein the intermediary data attribute is a child of the first data attribute.

13. The method of claim 9, further comprising, retaining, using the one or more computing device processors, and based on the new version of the intermediary data attribute, the first data attribute associated with the first input data, wherein the new version of the intermediary data attribute is substantially equivalent to a previous version of the intermediary data attribute.

14. The method of claim 9, further comprising transmitting, using the one or more computing device processors, a second communication to the first computing device, wherein a response, from the first computing device, to the second communication determines a validity of the first data attribute associated with the first input data.

15. The method of claim 9, wherein a period of validity associated with the first data attribute has not expired.

16. The method of claim 9, wherein the first communication is generated further based on the first data attribute.

17. The method of claim 9, wherein the first data attribute is sensed based on accessing the graph.

18. The method of claim 9, wherein the first computing device comprises one or more computing devices associated with a user associated with the first response.

19. The method of claim 9, further comprising:
sensing, using the one or more computing device processors, a second data attribute associated with the first input data; and
determining, using the one or more computing device processors, the second data attribute is equivalent to a second desired data attribute,
wherein the second data attribute cannot be nullified or invalidated.

20. An apparatus for communication generation, based on traversing routes of a graph, in a complex computing network, the apparatus comprising one or more computing device processors configured for:
establishing a first connection to a first input data system;
receiving, from the first input data system, a first desired data attribute;

establishing a second connection to a second input data system;

receiving, from the second input data system, first input data;

establishing a third connection to a third input data system or the second input data system;

accessing a graph stored at the third input data system or the second input data system, the graph comprising a plurality of data attributes and routes among at least some data attributes in the plurality of data attributes;

sensing a first data attribute associated with the first input data;

determining the first data attribute is equivalent to the first desired data attribute;

determining an intermediary data attribute on the graph, wherein a route connects, either directly or indirectly, the intermediary data attribute to the first data attribute on the graph;

determining a period of validity associated with the intermediary data attribute has expired;

in response to determining the period of validity associated with the intermediary data attribute has expired, generating based on the intermediary data attribute, a first communication for transmission to a first computing device;

transmitting the first communication to the first computing device;

receiving a first response, to the first communication, from the first computing device;

determining, based on the first response to the first communication, a new version of the intermediary data attribute associated with the first input data;

determining whether the new version of the intermediary data attribute associated with the first input data: is consistent or inconsistent with a previous version of the intermediary data attribute associated with the first input data, or is consistent or inconsistent with the first data attribute associated with the first input data; and determining, based on the new version of the intermediary data attribute associated with the first input data: being consistent or inconsistent with a previous version of the intermediary data attribute associated with the first input data, or being consistent or inconsistent with the first data attribute associated with the first input data, whether to nullify or invalidate the first data attribute associated with the first input data, wherein the one or more computing device processors are comprised in at least one of the first input data system, the second input data system, the third input data system, the first computing device, or a server.

* * * * *